3,310,434
METHOD OF CATALYZING POROUS ELECTRODES
Karl V. Kordesch, Lakewood, Ohio, assignor to Union Carbide Corporation, a corporation of New York
No Drawing. Filed May 6, 1963, Ser. No. 278,394
10 Claims. (Cl. 117—227)

This invention relates generally to a method of catalyzing porous electrodes and, more particularly, to an improved method of catalyzing a porous fuel cell electrode having a wetproofing agent deposited therein.

A fuel cell may be considered as a primary galvanic cell, the basic reaction of which is the electrochemical oxidation of a fuel. Fuel cells, however, differ from ordinary primary cells, such as the Leclanché dry cell, in that the fuel and the oxidant are generally introduced into the porous cell electrodes during production of electricity. In fuel cells, the electrodes and the electrolyte should, in theory at least, maintain a constant value, while the fuel and oxidant react electrochemically and the electricity and product of reaction are removed from the cell.

Fuel cell electrodes are generally composed of a porous material, such as porous nickel or carbon, which provides a three-phase interface or reaction zone where the fuel or oxidant, the electrolyte, and the electrode meet. In order to promote the desired reactions at this interface, the reaction zone of the electrode is usually catalyzed with an appropriate anodic or cathodic catalyst. Heretofore, such electrodes have usually been catalyzed by applying a catalyzing solution of a noble metal salt to the surface of the electrode and then decomposing the salt to deposit the active noble metal in the electrode reaction zone. However, in the case of electrodes which have been previously wetproofed to prevent electrode drowning, it is difficult for the catalyzing solution to penetrate through the wetproofing agent to the electrode material. As a result, the wetproofed electrodes are often not effectively catalyzed, especially when the electrode contains a relatively high proportion of wetproofing agent.

It is, therefore, the main object of the present invention to provide an improved method of catalyzing porous electrodes which have been wetproofed.

It is another object of the invention to provide such a method which permits the catalyzing solution to penetrate through the wetproofing agent to reach the conductive electrode material.

It is a further object to provide such a method which provides effective catalyzing of porous electrodes which contain a relatively high proportion of wetproofing agent.

Other aims and advantages of the invention will be apparent from the following description and appended claims.

In accordance with the present invention, there is provided a method of catalyzing a porous electrode having a wetproofing agent deposited thereon, which method comprises applying to a surface of the electrode a catalyzing solution containing a salt of a noble metal catalyst and a solvent for the wetproofing agent so that the catalyzing solution penetrates through the wetproofing agent to the electrode material, and then decomposing the salt to deposit the noble metal catalyst on the electrode. As used herein, the term "solvent" refers to any material which dissolves and/or softens the electrode wetproofing agent sufficiently to permit the catalyzing solution to penetrate through the wetproofing agent to the electrode material.

By providing the catalyzing solution with a solvent for the wetproofing agent, this invention permits the catalyzing solution to penetrate through the wetproofing agent to reach the conductive electrode material. The added solvent not only etches, leaches, or softens the wetproofing agent sufficiently to permit the catalyzing solution to penetrate therethrough, but also acts as a competitive absorbent; that is, the solvent competes with the noble metal salt to be adsorbed onto the electrode substrate, thus permitting deep penetration of the catalyzing solution into the electrode before precipitation of the noble metal occurs.

Porous electrodes having wetproofing agents deposited therein are well known in the art, and the inventive method is applicable to electrodes made of carbon, metal, or any other suitable conductive material. The wetproofing agent may be deposited on the electrode by any of the known methods. For example, the porous electrode may be wetproofed by immersion in a bath of the wetproofing agent dissolved in a solvent, by vapor deposition of the wetproofing agent, by the use of a thermoplastic binder in making the electrode, or by any other suitable technique. In general, the concentration of wetproofing agent in the electrode zone to be catalyzed should be at least about one weight percent. The method of this invention is especially useful in the case of electrodes containing about 3 to 10 weight percent or more wetproofing agent in the zone to be catalyzed.

The solvent of the catalyzing solution should contain at least about 50 volume percent of a solvent for the particular wetproofing agent employed. Of course, the solvent for the catalyzing solution may be composed entirely of one or more solvents for the wetproofing agent, provided the particular noble metal salt employed is also soluble in those solvents or solvent mixtures. If the solvent for the wetproofing agent is mixed with other liquid media, such as an aqueous solution of the noble metal salt, the various liquids must be miscible with each other. Also, all the liquids in the catalyzing solution must be sufficiently volatile to be completely removed from the electrode body by heating to temperatures in the range of about 100° C. to 200° C.

The particular solvent employed in the catalyzing solution depends on the type of wetproofing agent in the electrode. For example, if the wetproofing agent is paraffin wax, paraffin oil, or similar materials, suitable solvents are various low boiling alcohols, such as methyl alcohol, with boiling points in the range of 50° C. to 110° C. Ketones, such as methyl ethyl ketone or acetone, and esters, such as methyl acetate, with boiling points in the same range are also useful. If the wetproofing agent is low molecular weight polyethylene or polypropylene, suitable solvents are acetone and higher alcohols or mixtures thereof.

The method of this invention may be used with any of a number of noble metal catalysts, the most useful of which are cobalt, rhodium, iridium, palladium, platinum, silver, gold, ruthenium, and osmium. Of course, the choice of specific catalysts depends mainly on the intended use for the final electrode. The noble metal salt which is dissolved in the catalyzing solution is preferably one which forms volatile reaction products. Chlorides are generally preferred, but many other salts such as acetates and nitrates are also suitable. The concentration of noble metal salt in the catalyzing solution and/or the amount of solution applied to the electrode depends mainly on the concentration of catalyst desired in the final catalyzed electrode. In the case of carbon electrodes, it is preferred to deposite the noble metal catalyst in a concentration of about 0.2 to 2 milligrams/cm.$^2$.

The decomposition of the noble metal salt on the electrode and the removal of the liquid solvent and volatile reaction products are achieved by heating the electrode at a temperature in the range of about 100° C. to about 200° C. In the case of carbon electrodes which have been wetproofed with paraffin wax, the heating step may be carried out by simply placing the electrode in an oven for about 2 to 24 hours. In the case of electrodes which have been wetproofed by the use of a thermoplastic binder, it is preferred to place the electrode on a graphite plate with its active surface up. The upper surface of the electrode is then heated by infrared lamps, while the graphite base acts as a heat sink to cool the body of the electrode and prevent softening of the thermoplastic binder therein.

In an example of the present invention, a porous carbon electrode containing about 6 weight percent paraffin wax was catalyzed with a solution of equal parts by volume of isopropyl alcohol and a solution prepared by dissolving 9.8 grams of rhodium chloride and 1.3 grams of palladium chloride in 16 cc. of water. One cc. of the catalyzing solution was applied to one surface (200 cm.$^2$) of the electrode, and the electrode was then placed in an oven at a temperature of 175° C. for 16 hours. The resulting electrode contained about one milligram of noble metal catalyst per square centimeter of electrode area. This electrode was used as the hydrogen electrode in a standard hydrogen-oxygen fuel cell and was operated at a current density of 50 amps/ft.$^2$ for more than 3000 hours.

In another example of the invention, a porous carbon electrode containing about 20 weight percent low molecular weight polyethylene as a thermoplastic binder was catalyzed with a solution of 5 grams of rhodium chloride dissolved in 250 cc. of acetone. 2.5 cc. of the catalyzing solution were applied to the electrode surface (25 cm.$^2$), and the electrode was placed on a graphite block. A quarter-inch glass plate was placed on the electrode to keep it in intimate contact with the graphite block, and infrared lamps (250 watts) were placed 1.5 inches from the upper electrode surface. The electrode was heated in this manner for about 20 minutes to set the catalyst. The resulting catalyzed electrode was used as the hydrogen electrode in a conventional hydrogen-oxygen fuel cell and was operated at current densities of up to 100 amps/ft.$^2$. In contrast, similar polyethylene-bonded electrodes which were treated with an aqueous solution, an ethylene glycol solution, or an ammonium formate solution of rhodium chloride were substantially inoperable in the same fuel cell because the catalyzing solution was not able to penetrate into the highly liquid-repellent electrode.

In a series of electrodes wetproofed with a mixture of paraffin in kerosene, 90 percent of the electrodes catalyzed by the method of the invention reached 1000 hours performance at 50 amps/ft.$^2$, compared with 10 to 20 percent for electrodes catalyzed without the use of a solvent for the wetproofing agent.

While various specific forms of the present invention have been described herein in some detail, it will be understood that the same are susceptible of numerous modifications within the scope of the invention. For example, the catalyzing solution may be applied to the electrode surface in a single application or in a plurality of applications with intermittent heating. Also, the solvent for the wetproofing agent and the solution of the noble metal salt may be applied to the electrode separately rather than as a single solution.

What is claimed is:

1. A method of catalyzing a porous electrode having a wetproofing agent deposited thereon, which method comprises applying to a surface of said electrode a catalyzing solution containing a salt of a noble metal catalyst and a solvent for said wetproofing agent so that said catalyzing solution penetrates through said wetproofing agent to the electrode material, and then decomposing said salt to deposit said noble metal catalyst on said electrode.

2. The method of claim 1 wherein the solvent of said catalyzing solution contains at least about 50 volume percent of said solvent for said wetproofing agent.

3. The method of claim 1 wherein the solvent of said catalyzing solution is volatile at temperatures of about 100° C. to 200° C.

4. The method of claim 1 wherein said electrode contains at least about one weight percent wetproofing agent in the zone to be catalyzed.

5. The method of claim 1 wherein said noble metal catalyst is deposited on said electrode in a concentration of about 0.2 to 2 milligrams per square centimeter.

6. The method of claim 1 wherein said noble metal catalyst is at least one metal selected from the group consisting of cobalt, rhodium, iridium, palladium, platinum, silver, gold, ruthenium, and osmium.

7. The method of claim 1 wherein said wetproofing agent is paraffin and said solvent for said wetproofing agent is selected from the group consisting of methyl alcohol, ethyl alcohol, isopropyl alcohol, butyl alcohol, methyl ethyl ketone, acetone, and methyl acetate.

8. The method of claim 1 wherein said wetproofing agents is selected from the group consisting of low molecular weight polyethylene and polypropylene and said solvent for said wetproofing agent is selected from the group consisting of acetone and higher alcohols.

9. A method of catalyzing a porous electrode having a wetproofing agent deposited thereon, which method comprises applying to a surface of said electrode a catalyzing solution containing a salt of a noble metal catalyst and a solvent for said wetproofing agent so that said catalyzing solution penetrates through said wetproofing agent to the electrode material, and then heating said electrode to a temperature in the range of about 100° C. to about 200° C. to decompose said salt and to remove volatile solvent and reaction products from said electrode.

10. In a method of catalyzing a porous electrode having a wetproofing agent deposited thereon, which method comprises applying a solution of a noble metal salt to a surface of said electrode and then decomposing said salt to deposit said noble metal as a catalyst on said electrode, the improvement comprising providing said catalyzing solution with a solvent for said wetproofing agent so that said catalyzing solution penetrates through said wetproofing agent to the electrode material.

References Cited by the Examiner

UNITED STATES PATENTS

| | | | |
|---|---|---|---|
| 2,806,256 | 9/1957 | Smith-Johannsen | 117—63 X |
| 3,120,457 | 2/1964 | Duddy | 136—120 |

ALFRED L. LEAVITT, *Primary Examiner.*

W. L. JARVIS, *Examiner.*